(12) United States Patent
Suzuki et al.

(10) Patent No.: US 9,452,596 B2
(45) Date of Patent: Sep. 27, 2016

(54) IMPACT-ABSORBING MEMBER (71) Applicant: Toray Industries, Inc., Tokyo (JP)

(72) Inventors: Shigemitsu Suzuki, Nagoya (JP); Masaru Akita, Nagoya (JP); Osamu Niwa, Tokyo (JP); Tadayuki Uesugi, Nagoya (JP); Takuya Inoue, Otsu (JP); Kosaku Hashimoto, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/419,116

(22) PCT Filed: Sep. 2, 2013

(86) PCT No.: PCT/JP2013/073531
§ 371 (c)(1),
(2) Date: Feb. 2, 2015

(87) PCT Pub. No.: WO2014/038508
PCT Pub. Date: Mar. 13, 2014

(65) Prior Publication Data
US 2015/0231866 A1 Aug. 20, 2015

(30) Foreign Application Priority Data

Sep. 6, 2012 (JP) .................................. 2012-195988
Apr. 1, 2013 (JP) .................................. 2013-075766

(51) Int. Cl.
*B32B 27/34* (2006.01)
*B32B 25/04* (2006.01)
(Continued)

(52) U.S. Cl.
CPC ................. *B32B 27/34* (2013.01); *B32B 1/00* (2013.01); *B32B 5/10* (2013.01); *B32B 25/042* (2013.01); *B32B 2250/02* (2013.01); *B32B 2307/558* (2013.01); *B32B 2605/00* (2013.01); *Y10T 428/1372* (2015.01); *Y10T 428/24967* (2015.01);
(Continued)

(58) Field of Classification Search
CPC ............. B32B 1/00; B32B 1/02; B32B 5/10; B32B 27/12; B32B 27/34; Y10T 428/1372; Y10T 428/31725; Y10T 428/31728; Y10T 428/31732
See application file for complete search history.

(56) References Cited

U.S. PATENT DOCUMENTS 5,221,712 A 6/1993 Ohmae et al.
2007/0243343 A1 10/2007 Imaizumi et al.
(Continued)

FOREIGN PATENT DOCUMENTS

JP 2002-283522 10/2002
JP 2006-083227 3/2006
(Continued)

OTHER PUBLICATIONS

Supplementary European Search Report dated Mar. 8, 2016 of corresponding European Application No. 13834849.5.

*Primary Examiner* — Walter B Aughenbaugh
(74) *Attorney, Agent, or Firm* — DLA Piper LLP (US)

(57) ABSTRACT

An impact-absorbing member, wherein a formed body (D1) made of a fiber-reinforced resin composition includes a polyamide resin, a rubbery polymer having a reactive functional group and a fibrous inorganic filling material is superposed on another formed body (D2) made of a non-reinforced resin composition comprising a polyamide resin and a rubbery polymer having a reactive functional group, wherein the formed body (D1) is disposed at an impact-receiving side.

16 Claims, 2 Drawing Sheets

(51) Int. Cl.
  *B32B 1/00* (2006.01)
  *B32B 5/10* (2006.01)

(52) U.S. Cl.
  CPC ..... *Y10T 428/254* (2015.01); *Y10T 428/31511* (2015.04); *Y10T 428/31725* (2015.04); *Y10T 428/31728* (2015.04); *Y10T 428/31732* (2015.04)

(56) References Cited

U.S. PATENT DOCUMENTS

| | | |
|---|---|---|
| 2008/0166511 A1 | 7/2008 | Honma et al. |
| 2009/0239013 A1* | 9/2009 | Otaki ............... B32B 27/08 428/36.6 |
| 2011/0021707 A1 | 1/2011 | Kobayashi et al. |
| 2011/0220667 A1* | 9/2011 | Pfleghar ............ B32B 1/02 220/660 |
| 2011/0305863 A1 | 12/2011 | Morooka |

FOREIGN PATENT DOCUMENTS

| | | |
|---|---|---|
| JP | 2006-347151 | 12/2006 |
| JP | 2008-156604 | 7/2008 |
| JP | 2009-155365 | 7/2009 |
| JP | 2010-180962 | 8/2010 |
| JP | 2011-063015 | 3/2011 |
| JP | 2012-047299 | 3/2012 |
| JP | 2012-086578 | 5/2012 |
| WO | 2009/119624 | 1/2009 |
| WO | 2010/110077 | 9/2010 |
| WO | 2014/038509 | 3/2014 |

* cited by examiner

IMPACT-ABSORBING MEMBER

TECHNICAL FIELD

This disclosure relates to an impact-absorbing member capable of absorbing external impact energy with less deformation. Concretely, it relates to the impact-absorbing member in which a formed body made of a fiber-reinforced resin composition is superposed on another formed body made of a non-reinforced resin composition, wherein the formed body made of the fiber-reinforced resin composition is disposed at an impact-receiving side.

BACKGROUND

Recently, impact-absorbing members have been developed especially for automotive interiors and exteriors from a viewpoint of protection of pedestrians and passengers. Also, for containers used in mechanical systems, electrical systems or the like, impact-absorbing members have been developed for containers to protect persons and contents in case of collision, impact or drop. These conventional impact-absorbing members are mostly made of metal although the metal is recently being replaced by lightweight resin. The impact-absorbing member constituting a part of a structure is required to have stiffness enough to suppress deformation caused by impact, as well as a sufficient impact-absorption. Therefore it could be helpful to provide a material capable of absorbing external impact energy with less deformation. To meet such required specifications, a formed body made of fiber-reinforced resin composition or another formed body made of non-reinforced resin composition may be used as a resinous impact-absorbing member.

For example of the formed body made of fiber-reinforced resin composition, JP 2006-083227-A discloses an exterior formed body having non-reinforced polyamide resin layers disposed on both sides of a long fiber-reinforced polyamide resin layer in which a layer thickness ratio of [long fiber-reinforced resin layer/non-reinforced resin layer] is 1.0 or higher. JP 2002-283522-A discloses a multilayer injection-molded body having skin layers and a core layer, the skin layer being made of a composition of polyamide and olefin-based elastomer, the core layer being made of another composition of polyamide and a reinforcing filling material. However, such formed bodies as disclosed in those publications cannot meet the requirements of impact-absorbing members because the formed body of the fiber-reinforced resin composition absorbs impact energy as fracturing, so that a container made of the formed body might have leakage of fluid content and that external impact energy applied might spread sharp-edge fractions from the formed body in sharp-edge fracture morphology.

On the other hand, for example, of the non-reinforced resin composition, JP 2009-155365-A discloses an impact-absorbing member, which has a rib structure of 50% or more height of thickness of a plain portion and is made of thermoplastic resin composition comprising a thermoplastic resin and a resin having a reactive functional group. However, such a member as shown in those publications might deform greatly when external impact energy is applied. Particularly under the environment where deformation is restricted, it is difficult for the member to sufficiently absorb the impact energy and therefore to be provided as an impact-absorbing member.

It could therefore be helpful to provide an impact-absorbing member capable of absorbing external impact energy with less deformation.

SUMMARY

We thus provide:

[1] An impact-absorbing member, wherein a formed body (D1) made of a fiber-reinforced resin composition comprising a polyamide resin, a rubbery polymer having a reactive functional group and a fibrous inorganic filling material is superposed on another formed body (D2) made of a non-reinforced resin composition comprising a polyamide resin and a rubbery polymer having a reactive functional group, wherein the formed body (D1) is disposed at an impact-receiving side.

[2] The impact-absorbing member of [1], wherein a minimum thickness (d1) of the formed body (D1) is 1.0 to 10.0 mm while a minimum thickness (d2) of the formed body (D2) is 0.5 to 5.0 mm.

[3] The impact-absorbing member of [1] or [2], wherein a minimum thickness (d1) of the formed body (D1) and a minimum thickness (d2) of the formed body (D2) satisfy relations (I) and (II), $$2.3 \text{ mm} \leq (d1)+(d2) \leq 12.0 \text{ mm} \tag{I}$$

$$0.4 \leq (d1)/(d2) \leq 10.0. \tag{II}$$

[4] The impact-absorbing member of any one of [1] to [3], wherein the reactive functional group of the rubbery polymer is at least one kind of a reactive functional group selected from a group of epoxy group, acid anhydride group, amino group, carboxyl group, carboxyl metal salt and oxazoline group. [5] The impact-absorbing member of any one of [1] to [4], wherein the formed body (D1) and the formed body (D2) have a continuous phase (A) of the polyamide resin and a dispersed phase (B) of the rubbery polymer having the reactive functional group with a morphology of 10% or more of area covered with microparticles which have a particle diameter of 1 to 100 nm and are generated by a reaction between the polyamide resin and the rubbery polymer having the reactive functional group, wherein the continuous phase (A) and the dispersed phase (B) are observed with an electron microscope. [6] The impact-absorbing member of any one of [1] to [5], wherein the member receives an impact force in a protective container.

We provide an impact-absorbing member capable of absorbing external impact energy with less deformation. Our impact-absorbing members are suitably applied to an automotive interior or exterior to protect pedestrians and passengers, as well as a protective container for mechanical systems or electrical systems.

EXPLANATION OF SYMBOLS

1: impact force
2: impact-receiving surface
3: opposite surface 4, 4a: formed body (D1)
5, 5a: formed body (D2)
6: notch
7: screw pitch
8: screw flight
9: mixing screw
10, 10a: impact-absorbing member
11: impact-receiving side
12: opposite side
13: screw
14: screw hole
d1: minimum thickness of formed body (D1)
d2: minimum thickness of formed body (D2)
D: screw diameter

DETAILED DESCRIPTION

Hereinafter, our impact-absorbing member will be explained in detail. Our impact-absorbing member is produced by superposing formed body (D1) made of fiber-reinforced resin composition on formed body (D2) made of non-reinforced resin composition.

The fiber-reinforced resin composition constituting formed body (D1) contains polyamide resin (A), rubbery polymer (B) having reactive functional group, and fibrous inorganic filling material (C), and may contain another component as needed. The fiber-reinforced resin composition constituting formed body (D1), which contains polyamide resin (A), is excellent in formability so that the impact-absorbing member can be improved in heat resistance, chemical resistance, oil resistance, abrasion resistance, impact resistance, strength, toughness and stiffness. The fiber-reinforced resin composition, which contains rubbery polymer (B) having reactive functional group, can improve the impact-absorbing member in impact-absorbing ability. The fiber-reinforced resin composition, which contains the fibrous inorganic filling material, can improve the impact-absorbing member in heat resistance, strength and stiffness.

The non-reinforced resin composition constituting formed body (D2) contains polyamide resin (A) and rubbery polymer (B) having reactive functional group, and may contain another component (except for the fibrous filling material) as needed. The non-reinforced resin composition constituting formed body (D2), which contains polyamide resin (A), is excellent in formability so that the impact-absorbing member can be improved in heat resistance, chemical resistance, oil resistance, abrasion resistance, impact resistance, strength, toughness and stiffness. The non-reinforced resin composition, which contains rubbery polymer (B) having reactive functional group, can improve the impact-absorbing member in impact-absorbing ability.

Polyamide resin (A) contained in the fiber-reinforced resin composition may be or may not be the same as polyamide resin (A) contained in the non-reinforced resin composition while rubbery polymer (B) having reactive functional group contained in the fiber-reinforced resin composition may be or may not be the same as rubbery polymer (B) having reactive functional group contained in the non-reinforced resin composition.

Polyamide resin (A) contained in formed body (D1) and formed body (D2) mean a resin comprising a polymer having an amide bond. Polyamide resin (A) consists primarily of amino acid, lactam or diamine and dicarboxylic acid. The amino acid may be 6-aminocaproic acid, 11-amino undecanoic acid, 12-amino dodecanoic acid, p-amino methyl benzoic acid or the like. The lactam may be ε-caprolactam, ω-laurolactam or the like. The diamine may be an aliphatic diamine such as tetramethylene diamine, pentamethylene diamine, hexamethylene diamine, 2-methyl pentamethylene diamine, nonamethylene diamine, decamethylene diamine, undecamethylene diamine, dodecamethylene diamine, 2,2,4-/2,4,4-trimethyl hexamethylene diamine and 5-methyl nonamethylene diamine, an aromatic diamine such as m-xylylene diamine and p-xylylene diamine, an alicyclic diamine such as 1,3-bis(aminomethyl)cyclohexane, 1,4-bis (aminomethyl)cyclohexane, 1-amino-3-amino methyl-3,5, 5-trimethyl cyclohexane, bis(4-amino cyclohexyl) methane, bis(3-methyl-4-amino cyclohexyl) methane, 2,2-bis(4-amino cyclohexyl) propane, bis(aminopropyl) piperazine, aminoethyl piperazine or the like. The dicarboxylic acid may be an aliphatic dicarboxylic acid such as adipic acid, suberic acid, azelaic acid, sebacic acid, the dodecanedioic acid, an aromatic dicarboxylic acid such as terephthalic acid, isophthalic acid, 2-chloroterephthalic acid, 2-methyl terephthalic acid, 5-methyl isophthalic acid, 5-sodium sulfoisophthalic acid, a 2,6-naphthalenedicarboxylic acid, hexahydroterephthalic acid, hexahydroisophthalic acid, an alicyclic dicarboxylic acid such as 1,4-cyclohexane dicarboxylic acid, 1,3-cyclohexane dicarboxylic acid, 1,3-cyclopentane dicarboxylic acid or the like. Two or more kinds of these raw materials may be employed. Polyamide resin (A) may be of homopolymer or copolymer.

It is preferable that the polyamide resin has a crystallization temperature of 150° C. or higher, so that the impact-absorbing member is improved in heat resistance and strength. The polyamide resin having crystallization temperature of 150° C. or higher may be polycaproamide (polyamide 6), polyhexamethylene adipamide (polyamide 66), polypentamethylene adipamide (polyamide 56), polytetramethylene adipamide (polyamide 46), polyhexamethylene sebacamide (polyamide 610), polypentamethylene sebacamide (polyamide 510), polytetramethylene sebacamide (polyamide 410), polyhexamethylene dodecamide (polyamide 612), polyundecaneamide (polyamide 11), polydodecaneamide (polyamide 12), polycaproamide/polyhexamethylene adipamide copolymer (polyamide 6/66), polycaproamide/polyhexamethylene terephthalamide copolymer (polyamide 6/6T), polyhexamethylene adipamide/polyhexamethylene terephthalamide copolymer (polyamide 66/6T), polyhexamethylene adipamide/polyhexamethylene isophthalamide copolymer (polyamide 66/6I), polyhexamethylene adipamide/polyhexamethylene isophthalamide/polycaproamide copolymer (polyamide 66/6I/6), polyhexamethylene terephthalamide/polyhexamethylene isophthalamide copolymer (polyamide 6T/6I), polyhexamethylene terephthalamide/polydecaneamide copolymer (polyamide 6T/12), polyhexamethylene adipamide/polyhexamethylene isophthalamide copolymer (polyamide 66/6T/ 6I), polyxylylene adipamide (polyamide XD6), polyhexamathylene terephthalamide/poly-2-methylpentamethylene terephthalamide copolymer (polyamide 6T/M5T), polyhexamethylene terephthalamide/polypentamethylene terephthalamide copolymer (polyamide 6T/5T), polypentamethylene terephthalamide/polypentamethylene adipamide copolymer (5T/56), polynonamethylene terephthalamide (polyamide 9T), polydecamethylene terephthalamide (polyamide 10T), copolymer thereof or the like. Two or more kinds of these may be employed according to required characteristics such as heat resistance, chemical resistance, oil resistance, abrasion resistance, impact resistance, strength, toughness and stiffness of the impact-absorbing member, as well as formability of the fiber-reinforced resin composition or the non-reinforced resin composition. Above all, it is preferable to employ polyamide 6, polyamide 66, polyamide 56, polyamide 610, polyamide 510, polyamide 410, polyamide 612, polyamide 11, polyamide 12, polyamide 6/66, polyamide 66/6T, polyamide 6T/6I, polyamide 66/6I/6 or polyamide 6T/5T. It is more preferable to employ polyamide 6, polyamide 66 or polyamide 610, in order to achieve the formability of the fiber-reinforced resin composition and non-reinforced resin composition together with the impact-absorbing ability and stiffness of the impact-absorbing member at a higher level.

It is preferable that polyamide resin (A) has terminal amino groups of $3 \times 10^{-5}$ mol/g or more so that the reactivity to rubbery polymer (B) having reactive functional groups is improved and the impact-absorbing member is improved in impact-absorbing ability and stiffness at a higher level at the same time. The content of the terminal amino groups can be determined by dissolving the polyamide resin in 85 wt % phenol-ethanol solution to be subjected to a titration with hydrochloric acid solution as using a thymol blue indicator.

It is preferable that polyamide resin (A) has a viscosity number VN of 70 to 200 mL/g although the polymerization degree is not limited. The VN of 70 mL/g or more can achieve both impact-absorbing ability and stiffness of the impact-absorbing member at a higher level. It is more preferable that the VN is 85 mL/g or more, preferably 100 mL/g or more. The VN of 200 mL/g or less can improve the formability of the fiber-reinforced resin composition and non-reinforced resin composition. It is more preferable that the VN is 180 mL/g or less, preferably 150 mL/g or less. The viscosity number VN means a value determined with 96% sulfuric acid solvent according to ISO307. To adjust the VN of polyamide resin (A) into the above-described range, it is possible that a kind of polyamide resin having a desirable polymerization degree is selected or that two or more kinds of polyamide resins (A) having different polymerization degrees are appropriately mixed.

The rubbery polymer (B) having a reactive function group contained in formed body (D1) and formed body (D2) means a polymer which has a glass transition temperature less than room temperature and in which molecules are partially bound to each other by covalent bonding, ionic bonding, van der Waals force, interlace or the like. It is preferable that rubbery polymer (B) is a diene-based rubber such as polybutadiene, polyisoprene, styrene/butadiene random copolymer or block copolymer, or hydrogenated block copolymer thereof, acrylonitrile/butadiene copolymer and butadiene/isoprene copolymer, an ethylene/propylene random copolymer or block copolymer, an ethylene/butene random copolymer or block copolymer, an ethylene/α-olefin copolymer, an ethylene/unsaturated carboxylic ester copolymer such as ethylene/acrylic ester and ethylene/methacrylic acid ester, an acrylic ester/butadiene copolymer such as acrylic acid butyl/butadiene copolymer, an ethylene/aliphatic acid vinyl ester such as ethylene/vinyl acetate copolymer, an ethylene/propylene nonconjugated diene terpolymer such as ethylene/propylene/ethylidene norbornene copolymer and ethylene/propylene/hexadiene copolymer, butylene/isoprene copolymer, chlorinated polyethylene, or a thermoplastic elastomer such as polyamide elastomer and polyester elastomer.

Above all, it is preferable to employ the ethylene/unsaturated carboxylic acid ester copolymer, from a viewpoint of compatibility with polyamide resin (A). The unsaturated carboxylic acid ester may be (meth)acrylic ester, preferably ester of (meth)acrylic acid and alcohol. The (meth)acrylic ester may be methyl (meth)acrylate, ethyl (meth)acrylate, 2-ethyl hexyl (meth)acrylate, stearyl (meth)acrylate or the like. It is preferable that the weight ratio (ethylene/unsaturated carboxylic acid ester) of the ethylene component relative to the unsaturated carboxylic acid ester in the copolymer is 90/10 or less, preferably 85/15 or less. It is preferably 10/90 or more, preferably 15/85 or more. It is preferable that the number average molecular weight of the ethylene/unsaturated carboxylic acid ester copolymer is 1,000 to 70,000, to improve the impact-absorbing ability and stiffness of the impact-absorbing member, as well as the formability of the fiber-reinforced resin composition and non-reinforced resin composition.

The reactive functional group in rubbery polymer (B) should be capable of reacting to a functional group of polyamide resin (A) and may be epoxy group, acid anhydride groups, amino group, a carboxyl group, carboxyl metal salt, oxazoline group, hydroxyl group, isocyanate group, mercapto group, sulfone acid group or the like. Two or more kinds of these can be employed. Above all, it is preferable to employ epoxy group, acid anhydride group, amino group, carboxyl group, carboxyl metal salt or oxazoline group which can easily react without side reaction such as degradation and bridging. It is particularly preferable that rubbery polymer (B) has epoxy group, acid anhydride group, carboxyl group or carboxyl metal salt which can easily react to terminal amino groups of the polyamide resin.

The acid anhydride of the acid anhydride group may be maleic anhydride, itaconic anhydride, endic anhydride, citraconic anhydride, 1-butene-3,4-dicarboxylic anhydride or the like. Two or more kinds of these can be employed at the same time. Above all, it is preferable to employ maleic anhydride or itaconic anhydride.

The acid anhydride group can be introduced into the rubbery polymer by well-known techniques such as copolymerization of the acid anhydride with monomer constituting the rubbery polymer, and grafting of the acid anhydride with the rubbery polymer.

The epoxy group can be introduced into the rubbery polymer by a well-known technique such as copolymerization of monomer constituting the rubbery polymer with vinyl-based monomer having the epoxy group. The vinyl-based monomer may be an α,β-unsaturated acid glycidyl ester compound, such as glycidyl acrylate, glycidyl methacrylate, glycidyl ethacrylate and glycidyl itaconate. To introduce the epoxy group into the rubbery polymer, it is also possible that the rubbery polymer is polymerized with a polymerization initiator or chain transfer agent having epoxy group or that an epoxy compound is grafted with the rubbery polymer.

The carboxyl group can be introduced into the rubbery polymer by a well-known technique such as copolymerization of unsaturated carboxylic acid-based monomer having carboxylic group with monomer constituting the rubbery polymer. The unsaturated carboxylic acid may be (meth)acrylic acid or the like.

The reactive functional group may be (meth)acrylic acid metal salt or the like, which is a carboxylic metal salt of which carboxylic group has been partially replaced by metal salt. It is preferable that the metal of the metal salt is sodium of alkali metal, magnesium of alkaline earth metal, or zinc. Rubbery polymer (B) having carboxylic metal salt may be an ethylene/unsaturated carboxylic acid/unsaturated carboxylic acid metal salt copolymer, such as ethylene/acrylic acid/acrylic acid metal salt and ethylene/methacrylic acid/methacrylic acid metal salt, or the like. It is preferable that the weight ratio (unsaturated carboxylic acid component/unsaturated carboxylic acid metal salt component) of the unsaturated carboxylic acid relative to the unsaturated carboxylic acid metal salt component in the copolymer is 95/5 or less, preferably 90/10 or less. It is preferably 5/95 or more, preferably 10/90 or more.

It is preferable that rubbery polymer (B) has 1 to 10 of reactive functional groups per molecular chain. It preferably has 1 to 5 thereof so that side reaction such as cross-linkage is suppressed. It is permissible that some molecular chains have no functional group, although the less content is better.

It is preferable that polyamide resin (A) of 50 to 99 parts by weight and rubbery polymer (B) having the reactive functional group of 1 to 50 parts by weight are contained in total 100 parts by weight of polyamide resin (A) and rubbery polymer (B) having the reactive functional group in the fiber-reinforced resin composition constituting formed body (D1) and the non-reinforced resin composition constituting formed body (D2). Polyamide resin (A) of 99 parts by weight or less and rubbery polymer (B) having reactive functional group of 1 part by weight or more can make the impact-absorbing member improved in impact-absorbing ability. It is preferable that rubbery polymer (B) having reactive functional group is contained by 10 parts by weight or more, preferably 20 parts by weight or more. Polyamide resin (A) of 50 parts by weight or more and rubbery polymer (B) having the reactive functional group of 50 parts by weight or less can make the impact-absorbing member improved in strength and stiffness as well as formability of the fiber-reinforced resin composition and the non-reinforced resin composition. It is preferable that rubbery polymer (B) having reactive functional group is contained by 45 parts by weight or less, preferably 40 parts by weight or less.

Fibrous inorganic filling material (C) contained in the fiber-reinforced resin composition constituting formed body (D1) may be glass fiber, carbon fiber, wollastonite fiber, metal fiber or the like. These may be a hollow fiber. Two or more kinds of these may be employed at the same time. To improve the impact-absorbing member in strength and stiffness, it is preferable that the fibrous inorganic filling material is pretreated with coupling agent such as isocyanate-based compound, organic silane-based compound, organic titanate-based compound, organic borane-based compound and epoxy compound. Above all, it is preferable that the fibrous inorganic filling material is glass or carbon fiber.

Any conventional glass fiber may be employed. The glass fiber may have a shape of roving strand, milled fiber, or chopped strand made by cutting the fiber by a predetermined length. It is preferable that the glass fiber has an average fiber diameter of 5 to 15 μm. It is preferable that the average fiber diameter is 12 μm or less so that the impact-absorbing member is improved in impact-absorbing ability and stiffness.

It is preferable that fibrous inorganic filling material (C) is contained by 1 to 150 parts by weight in the fiber-reinforced resin composition constituting formed body (D1), relative to 100 parts by weight in total of polyamide resin (A) and rubbery polymer (B) having reactive functional group. Fibrous inorganic filling material (C) of 1 part by weight or more can improve the impact-absorbing member in heat resistance, strength and stiffness. It is preferable that fibrous inorganic filling material (C) is contained by 10 parts by weight or more, preferably 15 parts by weight or more. Fibrous inorganic filling material (C) of 150 parts by weight or less can improve a formability of the fiber-reinforced resin composition and an impact-absorbing ability of the impact-absorbing member. It is preferable that fibrous inorganic filling material (C) is contained by 120 parts by weight or less, preferably 100 parts by weight or less.

It is possible that various additives are contained in the fiber-reinforced resin composition constituting formed body (D1) and/or the non-reinforced resin composition constituting formed body (D2). The additive may be a crystal nucleating agent, a color protecting agent, an antioxidant or thermal stabilizer such as hindered phenol-based compound, hindered amine-based compound, hydroquinone-based compound, phosphite-based compound and substitutes thereof, copper halide and iodine compound, a weathering agent such as resorcinol system, salicylate-based compound, benzotriazole-based compound, benzophenone-based compound and hindered amine-based compound, a mold releasing agent such as aliphatic alcohol, aliphatic amide, aliphatic bisamide, ethylenebis stearyl amide and higher fatty acid ester, a plasticizer such as octyl p-oxybenzoic acid and N-butyl benzene sulfonamide, a lubricant agent, a dye-type coloring agent such as nigrosin and aniline black, a pigment-type coloring agent such as cadmium sulfide, phthalocyanine and carbon black, an alkyl sulfate-type anionic antistatic agent, quaternary ammonium salt-type cationic antistatic agent, non-ionic antistatic agent such as polyoxyethylene sorbitan monostearate, betaine-type amphoteric antistatic agent, a flame retarder such as melamine cyanurate, ammonium polyphosphate, brominated polystyrene, brominated polyphenylene oxide, brominated polycarbonate, brominated epoxy resin and a combination of these bromine-based compounds and antimony trioxide, a blowing agent or the like. Two or more kinds of these may be employed.

Above all, it is preferable that the antioxidant or thermal stabilizer is hindered phenol-based compound or phosphorous compound. It is preferable that the hindered phenol-based compound is an ester-type hindered phenol polymer, such as tetrakis[methylene-3-(3',5'-di-t-butyl-4'-hydroxyphenyl]propionate]methane, pentaerythrityl tetrakis[3-(3',5'-di-t-butyl-4'-hydroxyphenyl]propionate] and 3,9-bis[2-(3-(3-t-butyl-4-hydroxy-5-methylphenyl)propionyloxy)-1,1-dimethyl ethyl]-2,4,8,10-tetraoxaspiro[5,5]undecane. The phosphorous compound may be bis(2,6-di-t-butyl-4-methylphenyl)pentaerythritol-di-phosphite, bis(2,4-di-t-butyl phenyl)pentaerythritol-di-phosphite, bis(2,4-di-cumylphenyl)pentaerythritol-di-phosphite, tris(2,4-di-t-butyl phenyl) phosphite, tetrakis(2,4-di-t-butyl phenyl)-4,4'-bisphenylene phosphite, di-stearyl pentaerythritol-di-phosphite, triphenyl phosphite, 3,5-di-butyl-4-hydroxybenzyl phosphonate diethyl ester or the like.

It is preferable that the additive in the fiber-reinforced resin composition constituting formed body (D1) is contained by 0.01 to 20 parts by weight relative to 100 parts by weight in total of polyamide resin (A), rubbery polymer (B) having reactive functional group and fibrous inorganic filling material (C).

It is preferable that the additive in the non-reinforced resin composition constituting formed body (D2) is contained by 0.01 to 20 parts by weight relative to 100 parts by weight in total of polyamide resin (A) and rubbery polymer (B) having reactive functional group.

Formed body (D1) and formed body (D2) can be produced by a forming method such as injection molding, ejection compression molding, hollow molding, extrusion, sheet forming, compression, vacuum forming, foaming or the like. Above all, it is preferable to employ the injection molding. The formed body may have a shape such as flat plate, box, tray, truncated cone, truncated polygonal pyramid, truncated cone with cylinder, truncated polygonal pyramid with cylinder, sheet or the like. Above all, it is preferable to employ the flat plate, box or tray.

Our impact-absorbing member is characterized in that formed body (D1) made of fiber-reinforced resin composition is superposed on formed body (D2) made of non-reinforced resin composition, wherein formed body (D1) is disposed at an impact-receiving side. The term "superposed" means both "one formed body is placed on the other" and "one formed body is bonded onto the other" with said two formed bodies. To improve the impact-absorbing member in heat radiation, it is preferable that the formed bodies are bonded to each other. On the other hand, to improve the impact-absorbing member in impact-absorbing ability, it is preferable that a formed body is simply placed on the other formed body so that the formed bodies are deformed freely from each other.

The formed bodies can be bonded to each other by a mechanical bonding with bolts, a chemical bonding with adhesive, a welding of the formed bodies partially fused with hot plate, ultrasonic, vibration, laser or the like, a simultaneous or successive forming method such as lamination stacking, two-color molding, double forming, rotational molding and forming with stampable sheet or the like.

Figure 1A:
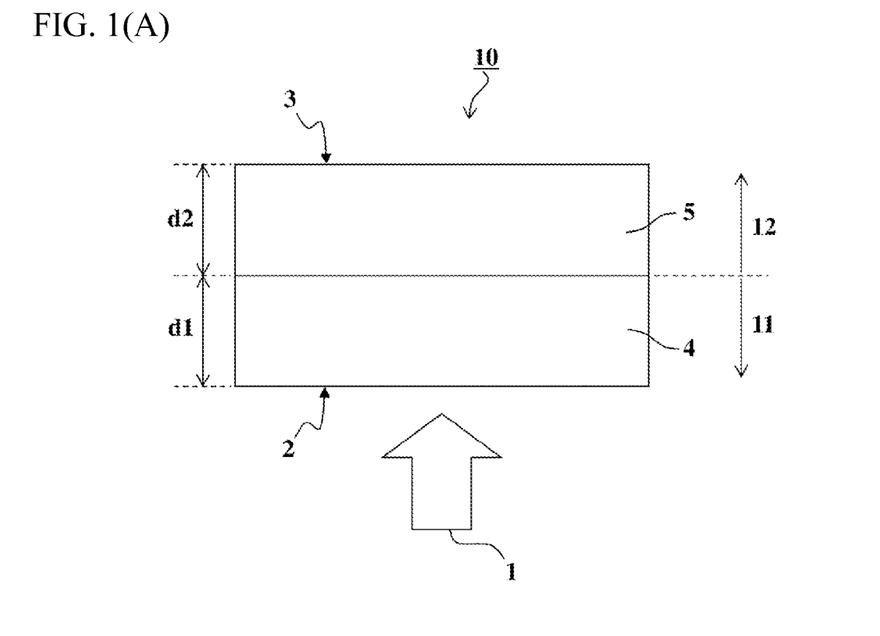
FIGS. 1A and 1B are schematic views showing a structure and disposition of an impact-absorbing member together with a directional relation of impact force applied.
Figure 1B:
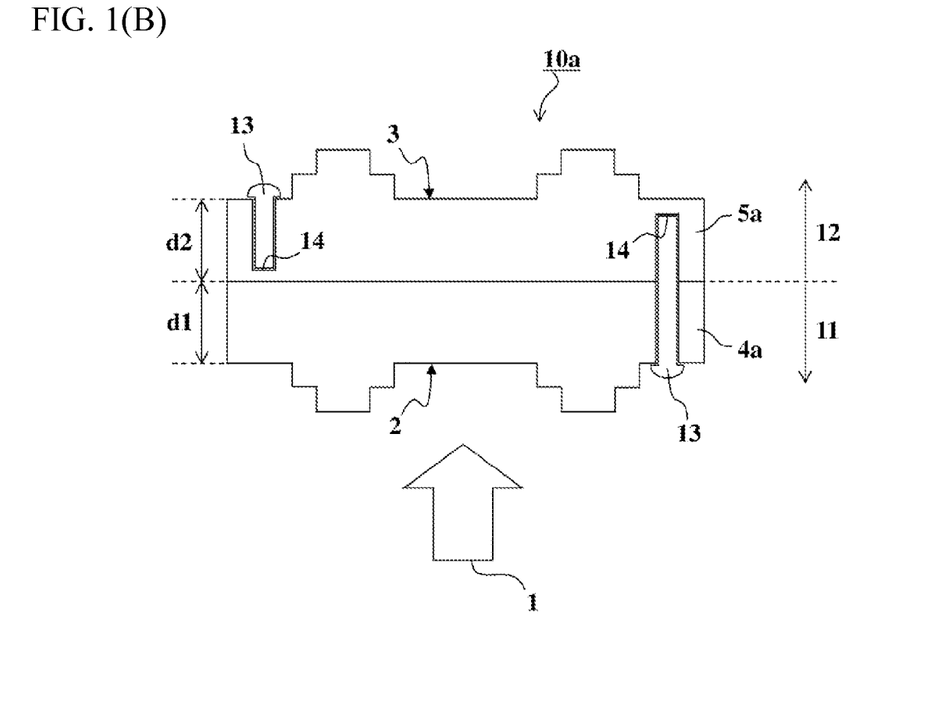

FIG. 1 is a schematic view showing a structure and disposition of our impact-absorbing member together with a directional relation of impact force applied. FIG. 1 (A) shows impact-absorbing member 10 made by superposing planar formed body 5 (D2) on planar formed body 4 (D1). FIG. 1 (B) shows impact-absorbing member 10a made by superposing formed body 5a (D2) having irregular thickness on formed body 4a (D1) having irregular thickness. In FIG. 1, symbol d1 indicates the minimum thickness of formed body 4 or 4a (D1) constituting the fiber-reinforced resin composition while symbol d2 indicates the minimum thickness of formed body 5 or 5a (D2) constituting the non-reinforced resin composition. It is preferable that an angle between impact-receiving surface 2 of formed body 4 (D1) and a direction in which impact force 1 is applied is 30° to 150°, preferably 87° to 93°, if the impact-receiving surface 2 is defined as a surface to receive impact force 1 directly on formed body 4 (D1) constituting the fiber-reinforced resin composition. As shown in FIG. 1 (A), formed body 5 (D2) is superposed on formed body 4 (D1), and formed body 4 (D1) is disposed at impact-receiving side 11 while formed body 5 (D2) is disposed at opposite side 12, so that impact-absorbing member 10 is improved in impact-absorbing ability and stiffness. FIG. 1 (B) shows impact-absorbing member 10a, of which mechanism is similar to the above-described mechanism.

In the impact-absorbing member, formed body (D1) constituting the fiber-reinforced resin composition is disposed at a side of receiving an impact. Such a structure that formed body (D1) constituting the fiber-reinforced resin composition is disposed at the impact-receiving side makes the impact-absorbing member improved in impact-absorbing ability and stiffness. In the impact-absorbing member, formed body (D1) constituting the fiber-reinforced resin composition disposed at the impact-receiving side plays an impact-absorbing role and a deformation-suppressing role. Formed body (D2) constituting the non-reinforced resin composition disposed at the opposite side plays a residual impact-absorbing role and a penetration breakdown-prevention role. Thus, external impact energy can be absorbed by formed body (D1) with less deformation. In addition, formed body (D2) absorbs residual impact energy to prevent sharp-edge fractions of formed body (D1) from spreading, so that the penetration and breakdown are prevented to protect persons and contents.

On the other hand, a single body of formed body (D1) might cause a sharp-edge fracture morphology when external impact energy is applied, so that a container made of the formed body might have leakage of fluid content and that sharp-edge fractions might spread from the formed body. A single body of formed body (D2) might make formed body (D2) penetrated with impacted substances or deformed greatly, when external impact energy is applied. If formed body (D2) is disposed at the impact-receiving side while formed body (D1) is disposed at the opposite side, formed body (D2) might be penetrated with impacted substances and formed body (D1) might be destructed in the sharp-edge fracture morphology.

In the impact-absorbing member, it is preferable that formed body (D1) constituting the fiber-reinforced resin composition has minimum thickness (d1) of 1.0 to 10.0 mm. Minimum thickness (d1) of formed body (D1) of 1.0 mm or more can improve the fiber-reinforced resin composition in formability as well as the impact-absorbing member in impact-absorbing ability and stiffness. It is preferable that minimum thickness (d1) is 1.5 mm or more, preferably 2.0 mm or more. Minimum thickness (d1) of formed body (D1) of 10.0 mm or less can make the impact-absorbing member lightweight and can even prevent vacuum voids and sink marks from being generated. It is preferable that minimum thickness (d1) is 8.0 mm or less, preferably 6.0 mm or less.

In the impact-absorbing member, it is preferable that formed body (D2) constituting the non-reinforced resin composition has minimum thickness (d2) of 0.5 to 5.0 mm. Minimum thickness (d2) of formed body (D2) of 0.5 mm or more can improve the non-reinforced resin composition in formability as well as the impact-absorbing member in impact-absorbing ability and stiffness. It is preferable that minimum thickness (d2) is 0.8 mm or more, preferably 1.0 mm or more. Minimum thickness (d2) of formed body (D2) of 5.0 mm or less can make the impact-absorbing member lightweight and can even prevent vacuum voids and sink marks from being generated. It is preferable that minimum thickness (d2) is 4.0 mm or less, preferably 3.0 mm or less.

Minimum thickness (d1) of formed body (D1) and minimum thickness (d2) of formed body (D2) can be determined by measuring the dimension of the formed body and/or the cut cross-section of the formed body with a micrometer or vernier caliper while observed with a microscope. Screw holes for drain provided in the formed body should be excluded from measurement points. If formed body 4a (D1) or formed body 5a (D2) has screw holes 14 as shown in FIG. 1 (B), the parts around screw holes 14 are excluded from the measurement range of minimum thickness (d1) and minimum thickness (d2).

In the impact-absorbing member, it is preferable that minimum thickness (d1) of formed body (D1) constituting the fiber-reinforced resin composition and minimum thickness (d2) of formed body (D2) constituting the non-reinforced resin composition satisfy formula (I) and formula (II), $$2.3 \text{ mm} \leq (d1)+(d2) \leq 12.0 \text{ mm} \tag{I}$$

$$0.4 \leq (d1)/(d2) \leq 10.0. \tag{II}$$

(d1)+(d2) of 2.3 mm or more can improve the fiber-reinforced resin composition and the non-reinforced resin composition in formability as well as the impact-absorbing member in impact-absorbing ability and stiffness. It is preferable that a value of (d1)+(d2) is 3.0 mm or more. (d1)+(d2) of 12.0 mm or less can make the impact-absorbing member lightweight. It is preferable that a value of (d1)+(d2) is 9.0 mm or less. 0.4 or more of the ratio (d1)/(d2) of minimum thickness (d1) of formed body (D1) that primarily plays roles of impact-absorbing and deformation-suppression to minimum thickness (d2) of formed body (D2) that primarily plays roles of residual impact-absorbing and penetration breakdown-prevention can suppress deformation of the impact-absorbing member when external impact energy is applied. It is preferable that a value of (d1)/(d2) is 0.7 or more. (d1)/(d2) of 10.0 or less can prevent the impact-absorbing member from being penetrated to cause a breakdown. It is preferable that (d1)/(d2) is 6.0 or less.

The fiber-reinforced resin composition constituting formed body (D1) and/or the non-reinforced resin composition constituting formed body (D2) can be produced under a melt condition or solution condition. From a viewpoint of reactivity improvement, it is preferable that it is produced under the melt condition. To produce it under the melt condition, an extruder or a kneader can be employed to perform a melt-compounding. From a viewpoint of productivity, it is preferable to employ the extruder capable of continuously performing the melt-compounding. The extruder performing the melt-compounding may be at least one single-screw extruder, twin-screw extruder, another multiple-screw extruder, twin-screw/single-screw composite extruder. From viewpoints of good compounding, reactivity and productivity, it is preferable to employ the multiple-screw extruder such as twin-screw extruder and quad-screw extruder, preferably twin-screw extruder to perform the melt-compounding.

To produce the fiber-reinforced resin composition constituting formed body (D1), polyamide resin (A), rubbery polymer (B) having reactive functional group and fibrous inorganic filling material (C) can be melt-compounded together with additives that are optionally added at any stages. Polyamide resin (A), rubbery polymer (B) having reactive functional group and fibrous inorganic filling material (C) may be melt-compounded with additives as needed, or polyamide resin (A) and rubbery polymer (B) having reactive functional group may be melt-compounded with additives as needed while fibrous inorganic filling material (C) is fed by a side-feeding method or the like. Alternatively, fibrous inorganic filling material (C) may be melt-compounded with preliminarily melt-compounded mixture of polyamide resin (A), rubbery polymer (B) having reactive functional group and optional additives.

Above all, it is preferable that polyamide resin (A) and rubbery polymer (B) having reactive functional group are melt-compounded with additives as needed to make composite composition (A-B) of polyamide resin-rubbery polymer and fibrous inorganic filling material (C) is fed by a side-feeding method or the like. It is also preferable that fibrous inorganic filling material (C) is melt-compounded with composite composition (A-B) of polyamide resin-rubbery polymer that is preliminarily prepared by melt-compounding polyamide resin (A), rubbery polymer (B) having reactive functional group and optional additives.

To produce the non-reinforced resin composition constituting formed body (D2), polyamide resin (A) and rubbery polymer (B) having reactive functional group can be melt-compounded together with additives that are optionally added at any stages. Polyamide resin (A) and rubbery polymer (B) may be melt-compounded with optional additives, or polyamide resin (A) and rubbery polymer (B) having reactive functional group may be melt-compounded while optional additives is fed by a side-feeding method or the like. Alternatively, the optional additives may be melt-compounded with preliminarily melt-compounded mixture of polyamide resin (A) and rubbery polymer (B) having reactive functional group. Above all, it is preferable that polyamide resin (A) and rubbery polymer (B) having reactive functional group are melt-compounded with additives as needed to make composite composition (A-B) of polyamide resin-rubbery polymer.

Composite composition (A-B) of polyamide resin-rubbery polymer, which is the non-reinforced resin composition constituting the formed body (D2) or an intermediate material of the fiber-reinforced resin composition constituting formed body (D1), can be produced by conventional methods as shown in the following items (1) to (4).

(1) JP 2008-156604-A

Thermoplastic resin (A) and resin (B) having reactive functional group are fed into a twin-screw extruder with multiple full-flight zones and kneading zones having 50 or more of ratio (L/D) of screw length L to screw diameter D, and then melt-compounded under a condition of Pkmax≥Pfmin+0.3, where Pkmax [MPa] is the maximum resin pressure in the kneading zone of the screw and Pfmin [MPa] is the minimum resin pressure in the full-flight zone of the screw.

(2) JP 2006-347151-A

Thermoplastic resin (A) and resin (B) having reactive functional group are put into a twin-screw extruder having 50 or more of ratio (L/D) of screw length L to screw diameter D, optionally together with thermoplastic resin other than (A), rubber other than (B), filling material and additives, and then melt-compounded under a condition that the retention time is 1 min to 30 min and the extrusion rate is 0.01 kg/h per screw rotation of 1 rpm.

(3) WO 2009/119624

Thermoplastic resin (A) and resin (B) having reactive functional group are melt-compounded as flowing elongationally, optionally together with thermoplastic resin other than (A), rubber other than (B), a filling material and additives.

(4) JP 2011-063015-A

Thermoplastic resin (A) and resin (B) having reactive functional group are melt-compounded with an extruder as flowing elongationally, optionally together with thermoplastic resin other than (A), rubber other than (B), filling material and additives, and then melt-compounded by a mixing screw having notch section.

Above all, it is preferable to employ the method shown in item (4), from viewpoints of impact-absorbing ability, stiffness and productivity of the impact-absorbing member. The L/D means a quotient of screw length L divided by screw diameter D. The screw length is defined as a length from the screw tipping to the upstream end of screw segment at a feed position of screw base where raw material is fed. "Upstream" is a side where raw materials are fed, while "downstream" is another side where melt resin is discharged.

To produce composite composition (A-B) from polyamide resin-rubbery polymer by the method shown in item (4), it is preferable that an inflow effect pressure drop is 100 to 500 kg/cm$^2$ (9.8–49 MPa) through a zone (elongational flow zone) for melt-compounding as flowing elongationally. The inflow effect pressure drop through the elongational flow zone can be determined by subtracting the pressure difference ($\Delta$P0) in the elongational flow zone from the pressure difference ($\Delta$P) upstream of the elongational flow zone. The inflow effect pressure drop of 100 kg/cm$^2$ (9.8 MPa) or more can greatly form the elongational flow in the elongational flow zone and make a pressure distribution more uniform. The inflow effect pressure drop of 500 kg/cm² (49 MPa) or less can suppress a back pressure in the extruder appropriately to easily achieve stable production.

From viewpoints of good compounding and reactivity, it is preferable that Lk/D is 3 to 8, where Lk is an elongational flow zone length in the extruder screw and D is a screw diameter.

It is preferable that the elongational flow zone is provided with kneading disks, which are preferably twist-kneading disks of which helix angle θ defined as an angle between the top on downstream side and the top on upstream side is 0° to 90° toward a half rotation direction of the screw.

Figure 2:
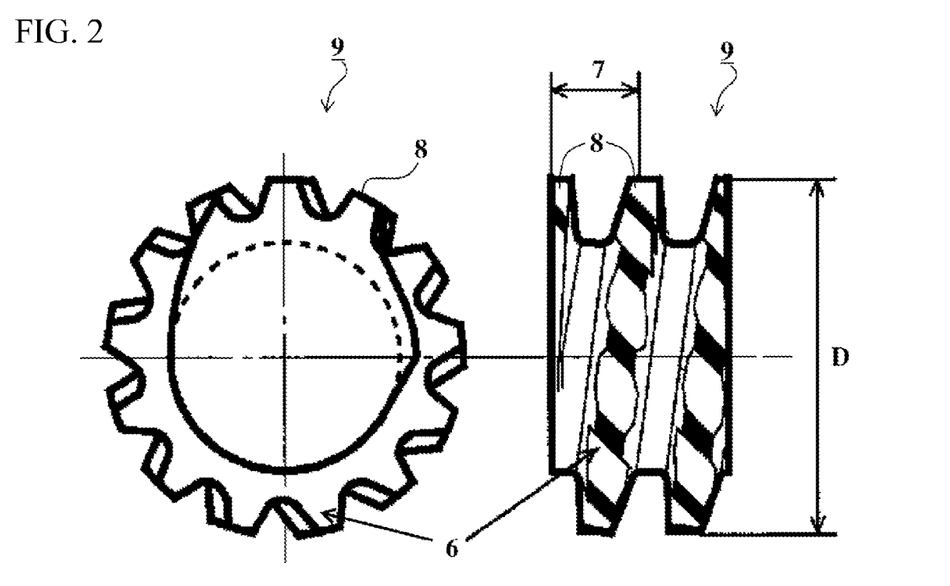
FIG. 2 is a schematic view of a mixing screw having notch section.

FIG. 2 is a schematic view of a mixing screw having notch section. FIG. 2 shows mixing screw 9 provided with notch 6 in screw flight 8. Symbol 7 indicates a screw pitch of mixing screw 9 while symbol D indicates a screw diameter. From a viewpoint of filling melted resin improved in cooling efficiency, compounding and reactivity, it is preferable that a zone (mixing zone) for melt-compounding with the mixing screw having notch section is provided with successively connected mixing screws which have 10 to 15 notches per pitch and a single-thread screw of screw-pitch length of 0.1D to 0.3D. The single-thread screw means a screw that advances by 1 pitch of ridge part of the screw flight when the screw rotates by 360°. The screw-pitch length means a distance between screw flights axially adjacent. The screw pitch of the single-thread screw is equal to an axially-advanced distance (lead) when the screw rotates by 360°. From a viewpoint of filling melted resin improved in cooling efficiency, compounding and reactivity, it is preferable that Lm/D is 5 to 15, where Lm is a mixing zone length in the extruder screw and D is a screw diameter. From a viewpoint of filling melted resin improved in cooling efficiency, compounding and reactivity, it is preferable that the two or more mixing zones are provided. From a viewpoint of filling melted resin improved in cooling efficiency, compounding and reactivity, it is preferable that 70% or more of the mixing screws with notch section provided in the mixing zone rotate in a direction opposite to the screw shaft rotation.

It is preferable that the melt-compounding is performed in a condition of Ck−Cm≥60 where Ck is a setting temperature of the extruder cylinder in the elongational flow and Cm is a setting temperature of the extruder cylinder in the mixing zone, so that the melt resin is greatly improved in cooling efficiency, compounding and reactivity. From a viewpoint of filling melted resin improved in cooling efficiency, compounding and reactivity, it is preferable that the elongational flow zones have a total length of 10 to 35% relative to the whole length of the extruder screw and that the mixing zones have a total length of 20 to 35% relative to the whole length of the extruder screw.

It is preferable that composite composition (A-B) of polyamide resin-rubbery polymer, which is the non-reinforced resin composition constituting formed body (D2) or an intermediate material of the fiber-reinforced resin composition constituting the formed body (D1), has continuous phase (A) of polyamide resin and dispersed phase (B) of rubbery polymer having a reactive functional group with morphology of 10% or more of area covered with microparticles which have a particle diameter of 1 to 100 nm and are generated by a reaction between the polyamide resin and the rubbery polymer having the reactive functional group, wherein continuous phase (A) and dispersed phase (B) are observed with an electron microscope. Thermoplastic resin (A) reacts to rubbery polymer (B) having reactive functional group to generate a compound in the interface between continuous phase (A) and dispersed phase (B) in general. If the compound increases as the reaction progresses between the thermoplastic resin and the rubbery polymer having reactive functional group, the compound may be sucked into continuous phase (A) and/or dispersed phase (B). The sucked compound forms a micelle that is observed as microparticles having a particle diameter of 1 to 100 nm with the electron microscope so that the sucked compound becomes stable. Therefore, the broader area covered with microparticles of particle diameter 1 to 100 nm implies the greater reaction between the thermoplastic resin and the rubbery polymer having reactive functional group. Such a morphology can be maintained even in formed body (D1) and formed body (D2). 10% or more of the area covered with microparticles in dispersed phase (B) can improve the fiber-reinforced resin composition and the non-reinforced resin composition in formability as well as the impact-absorbing member in impact-absorbing ability and stiffness.

The morphology can be observed by well-known technique. It can be observed directly with formed body (D1) and formed body (D2). The morphology can be observed with an injection molded body made of the polyamide resin composition since the morphology is generally maintained in the polyamide resin composition even after the melt-compounding. Therefore the following observation method can be employed. First, a cross-section center of formed body (D1), formed body (D2) or an ISO test piece made by injection-molding at a cylinder temperature of (polyamide resin melting point+25°) C. is cut into 1 to 2 mm square to dye rubbery polymer (B) having reactive functional group with ruthenium tetroxide. Thus dyed cut piece is sliced at −196° C. into an ultrathin slice of 0.1 μm or less (around 80 nm), with an ultramicrotome. The continuous phase and dispersed phase are observed at magnification of ×5,000 with a transmission electron microscope. Thermoplastic resin (A) is found to be black or gray while rubbery polymer (B) having reactive functional group is found to be white. If the continuous phase or dispersed phase cannot be observed at magnification of ×5,000, the magnification can be increased up to ×35,000 to observe the continuous phase or dispersed phase appropriately. The dispersed phase may be found to have a maximum diameter of 10 nm or more in the phase. Second, the magnification is increased to ×35,000 to detect microparticles having a particle diameter of 1 to 100 nm in dispersed phase (B). To determine a particle diameter and an area covered with microparticles in dispersed phase (B), an image analysis software "Scion Image" made by Scion Corporation can be employed. The particle diameter is represented by a number average particle diameter of 10 particles randomly-selected from an image observed. The particle diameter of each particle is defined as an average between the maximum diameter and the minimum diameter.

It is preferable that the composite composition (A-B) of polyamide resin-rubbery polymer, which is the non-reinforced resin composition constituting formed body (D2) or an intermediate material of the fiber-reinforced resin composition constituting formed body (D1), has a tensile elastic modulus satisfying a relation of E(V1)>E(V2) at V1<V2, where E(V1) and E(V2) are tensile elastic moduli corresponding to tension speeds of V1 and V2 respectively in a tensile test. Such a composite composition can improve the fiber-reinforced resins composition and non-reinforced resin composition in formability and the impact-absorbing member in impact-absorbing ability and stiffness. It is preferable that the above-described relation is satisfied at any tension speeds V1 and V2 of 10 mm/min or more and 500 mm/min or less, preferably 1 mm/min or more and 1,000 mm/min or less. The tensile test is performed according to a standard method such as JIS-5A with dumbbell test piece prepared by injection-molding. The tensile elastic modulus means an initial linear inclination of stress-strain curve. The tensile test is performed under a condition of the chuck interval of 50 mm when the dumbbell test piece is employed according to JIS-5A.

It is preferable that a relation of $\epsilon(V1)<\epsilon(V2)$ at $V1<V2$ is satisfied where $\epsilon(V1)$ and $\epsilon(V2)$ are tensile elongations at break at tension speeds V1 and V2 respectively. Such a composite composition can improve the fiber-reinforced resins composition and non-reinforced resin composition in formability as well as the impact-absorbing member in impact-absorbing ability and stiffness. The tensile elongation at break means an elongation length at a moment of break. It is preferable that the above-described relation is satisfied at any tension speeds V1 and V2 of 10 mm/min or more and 500 mm/min or less, preferably 1 mm/min or more and 1,000 mm/min or less. The tensile test is performed under a condition of the chuck interval of 50 mm when the dumbbell test piece is employed according to JIS-5A.

Our impact-absorbing member is excellent in formability, impact-absorbing ability and stiffness so that external impact energy applied to formed body (D1) is absorbed with less deformation. The impact-absorbing member is applicable to members to protect persons and contents because formed body (D2) absorbs residual impact energy and prevents sharp-edge fractions from spreading, so that the penetration and breakdown are prevented. Our impact-absorbing member is suitably applied to an automotive interior or exterior to protect pedestrians and passengers, as well as a protective container for mechanical systems or electrical systems, as follows.

Automotive Interior or Exterior to Protect Pedestrians

It is suitably applied to cowl louver, bumper, energy absorber, under cover, bonnet, fender or the like.

Automotive Interior or Exterior to Protect Passengers

It is suitably applied to crash pad, pillar trim, door trim, instrument panel, armrest, console box, lower limb disability relief member, interior member or the like.

Protective Container for Mechanical System

It is suitably applied to engine oil pan, engine cover or the like.

Protective Container for Electrical System

It is suitably applied to smartphone housing, cell-phone housing, PC housing, battery housing or the like.

EXAMPLES

Our impact-absorbing members will be explained in detail with reference to Examples which do not limit the scope of this disclosure. Examples and Comparative examples are evaluated by the following methods.

Stiffness

An ISO test piece is made by injection-molding at cylinder temperature of 260° C. and mold temperature of 80° C., and then subjected to a measurement of flexural modulus according to ISO178.

Charpy V-Notch Impact

An ISO test piece is made by injection-molding at cylinder temperature of 260° C. and mold temperature of 80° C., and then subjected to a measurement according to ISO179.

Microparticle Proportion in Dispersed Phase (B)

A cross section center of the ISO test piece made by injection-molding is cut into 1 to 2 mm square to dye the rubbery polymer having reactive functional group with ruthenium tetroxide. Thus dyed cut piece is sliced at −196° C. into an ultrathin slice of 0.1 μm or less (around 80 nm), with an ultramicrotome. First, a continuous phase and dispersed phase are observed at magnification of ×5,000 with a transmission electron microscope. Thermoplastic resin (A) is found to be black or gray while rubbery polymer (B) having reactive functional group is found to be white. If the continuous phase or dispersed phase cannot be observed at magnification of ×5,000, the magnification can be increased up to ×35,000 to observe the continuous phase or dispersed phase appropriately. The dispersed phase may be found to have a maximum diameter of 10 nm or more in the phase. Second, the magnification is increased to ×35,000 to detect microparticles having a particle diameter of 1 to 100 nm in dispersed phase (B) of rubbery polymer having reactive functional group. To determine an area covered with microparticles in dispersed phase (B), an image analysis software "Scion Image" made by Scion Corporation is employed. A particle diameter is represented by a number average particle diameter of 10 particles randomly-selected from an image observed. The particle diameter of each particle is defined as an average between the maximum diameter and the minimum diameter.

Impact-Absorbing Ability—1

A formed body rectangular plate of 80 mm×80 mm with predetermined thickness is made by injection-molding at cylinder temperature of 260° C. and mold temperature of 80° C., and then subjected to a high-speed drop-weight impact test with INSTRON 9250HV dynatup tester as dropping a weight of 10 kg having φ12.64 conical shape from height of 0.4 m. A deformation amount is measured by visually observing the surface after the test to determine a breakdown on the rectangular plate. The surfaces of formed body (D1) and formed body (D2) are evaluated according to the following standards.

Formed body (D1); no breakdown: A, crack: B, brittle failure: C

Formed body (D2); no breakdown: A, penetration or brittle failure: C

Impact-Absorbing Ability—2

As for Examples 21 to 25, impact-absorbing member produced by superposed formed body (D2) on formed body (D1) with ribs is subjected to a high-speed drop-weight impact test with INSTRON 9250HV dynatup tester as dropping a weight of 24 kg having φ12.64 conical shape from height of 0.3 m, in which formed body (D1) with ribs is disposed at the impact-receiving side while formed body (D2) is disposed at the opposite side. A deformation amount is measured by visually observing the surface after the test to determine a breakdown on the rectangular plate. The surfaces of formed body (D1) and formed body (D2) are evaluated according to the following standards.

Formed body (D1); no breakdown: A, crack: B, brittle failure: C

Formed body (D2); no breakdown: A, penetration or brittle failure: C

Examples and Comparative examples employ the following materials.

Polyamide Resin (A)

A-1: Polyamide 6 resin (viscosity number VN: 135 ml/g; crystallization temperature: 170° C.; terminal amino group concentration: $5.8 \times 10^{-5}$ mol/g)

A-2: Polyamide 66 resin (viscosity number VN: 135 ml/g; crystallization temperature: 207° C.; terminal amino group concentration: $3.5 \times 10^{-5}$ mol/g)

A-3: Polyamide 610 resin (viscosity number VN: 135 ml/g, crystallization temperature: 165° C., terminal amino group concentration: $3.4 \times 10^{-5}$ mol/g)

The terminal amino group is determined by dissolving the polyamide resin in 85 wt % phenol-ethanol solution to be subjected to a titration with hydrochloric acid solution as using a thymol blue indicator. The crystallization temperature is determined with a differential scanning calorimetry device (DSC) at increase/decrease rate of temperature of 20° C./min.

Rubbery Polymer (B) Having Reactive Functional Group
B-1: Ethylene/methyl acrylate/glycidyl methacrylate copolymer (BF-7L made by Sumitomo Chemical Co., Ltd.)
Weight ratio of copolymerization component: Ethylene/methyl acrylate/glycidyl methacrylate copolymer=70/27/3 [wt %])
B-2: Maleic anhydride-modified ethylene-1-butene copolymer (MH7010 made by Mitsui Chemicals, Inc.)
B-3: Ethylene-methacrylic acid-zinc methacrylate copolymer (HIMILAN 1706 made by Dupont-Mitsui Polychemicals Co., Ltd.)

Fibrous Inorganic Filling Material (C)
C-1: Glass fiber (T-249 made by Nippon Electric Glass Co., Ltd.; average fiber diameter $\phi$13.0 μm)
C-2: Glass fiber (T-251H made by Nippon Electric Glass Co., Ltd.; average fiber diameter $\phi$10.5 μm)

Other Resins
Resin R16: Fiber-reinforced resin containing no rubbery polymer (B) having reactive functional group (CM1011G30 made by Toray Industries, Inc.)
Resin R17: Non-reinforced resin containing no rubbery polymer (B) having reactive functional group (CM1021 made by Toray Industries, Inc.)

Producing Method P1

As performing a nitrogen flow, components mixed at proportions shown in Table 1 are melt-compounded at cylinder temperature 230° C., screw rotation rate 220 rpm and extrusion rate 300 kg/h with an equi-directional rotation complete meshing type twin-screw extruder (TEX-65αII made by The Japan Steel Works, Ltd.) having two double-thread screws of screw diameter of 65 mm and L/D=31.5, to discharge a strand of melt resin through the discharge spout (L/D=31.5). In the screw configuration, a zone (elongational flow zone) for melt-compounding as flowing elongationally is formed with twist-kneading disks of which helix angle θ defined as an angle between the top on downstream side and the top on upstream side is 20° toward a half rotation direction of the screw, the twist-kneading disks being connected by Lk/D=4.0 from the position of L/D=10. A reverse screw zone of L/D=0.5 is provided downstream of the elongational flow zone. The length ratio [%] of total length of elongational flow zones to whole screw length is found to be 13% by calculating according to formula of (total length of elongational flow zones)/(whole screw length)×100. The inflow effect pressure drop is found to be 150 kg/cm$^2$ (14.7 MPa) through the elongational flow zone by subtracting the pressure difference (ΔP0) in the elongational flow zone from the pressure difference (ΔP) upstream of the twist-kneading disk. Two mixing zones are formed with mixing screws having notch sections, the mixing screws have 12 notches per pitch and single-thread screws of screw-pitch length of 0.25D, and are connected by Lm/D=4.0 from the positions of L/D=16 and 21. The length ratio [%] of total length of mixing zones to whole screw length is found to be 25% by calculating according to formula of (total length of mixing zones)/(whole screw length)×100. 75% of the mixing screws with notch section provided in the mixing zone rotate in a direction opposite to the screw shaft rotation. Volatile components are removed at gauge pressure 0.1 MPa with a vent vacuum zone disposed at the position of L/D=27. The melt resin is discharged through the die head from 4 mm$\phi$×23 holes to be formed as a strand to be cooled through a cooling bath, so that a pellet of resin R1 sample is prepared by cutting with a pelletizer.

Producing Method P2

As performing a nitrogen flow, components mixed at proportions shown in Table 1 are melt-compounded at cylinder temperature shown in Table 1, screw rotation rate 220 rpm and extrusion rate 300 kg/h with an equi-directional rotation complete meshing type twin-screw extruder (TEX-65αII made by The Japan Steel Works, Ltd.) having two double-thread screws of screw diameter of 65 mm and L/D=35, to discharge a strand of melt resin through the discharge spout (L/D=35). In the screw configuration, three kneading zones started from the positions of L/D=7, 16 and 25 while each kneading zone has Lk/D of 3.0, 3.0 and 3.0 respectively. Reverse screw zones of Lr/D=0.5, 0.5 and 0.5 are provided downstream of the kneading zones. The length ratio [%] of total length of kneading zones to whole screw length is found to be 26% by calculating according to formula of (total length of kneading zones)/(whole screw length)×100. Volatile components are removed at gauge pressure 0.1 MPa with a vent vacuum zone disposed at the position of L/D=30. The melt resin is discharged through the die head from 4 mm$\phi$×23 holes to be formed as a strand to be cooled through a cooling bath, so that pellets of resin R2-R6 samples are prepared by cutting with a pelletizer.

Producing Method P3

As performing a nitrogen flow, components mixed at proportions shown in Table 2 are melt-compounded at cylinder temperature 230° C., screw rotation rate 350 rpm and extrusion rate 200 kg/h with an equi-directional rotation complete meshing type twin-screw extruder (TEX-65αII made by The Japan Steel Works, Ltd.) having two double-thread screws of screw diameter of 65 mm and L/D=45, to discharge a strand of melt resin through the discharge spout (L/D=45). In the screw configuration, a zone (elongational flow zone) for melt-compounding as flowing elongationally is formed with twist-kneading disks of which helix angle θ defined as an angle between the top on downstream side and the top on upstream side is 20° toward a half rotation direction of the screw, the twist-kneading disks being connected by Lk/D=4.0 from the position of L/D=10. A reverse screw zone of L/D=0.5 is provided downstream of the elongational flow zone. The length ratio [%] of total length of elongational flow zones to whole screw length is found to be 9% by calculating according to formula of (total length of elongational flow zones)/(whole screw length)×100. The inflow effect pressure drop is found to be 150 kg/cm$^2$ (14.7 MPa) through the elongational flow zone by subtracting the pressure difference (ΔP0) in the elongational flow zone from the pressure difference (ΔP) upstream of the twist-kneading disk. Two mixing zones are formed with mixing screws having notch sections, the mixing screws have 12 notches per pitch and single-thread screws of screw-pitch length of 0.25D, and are connected by Lm/D=4.0 from the positions of L/D=16 and 21. The length ratio [%] of total length of mixing zones to whole screw length is found to be 18% by calculating according to formula of (total length of mixing zones)/(whole screw length)×100. 75% of the mixing screws with notch section provided in the mixing zone rotate in a direction opposite to the screw shaft rotation. A reverse screw zone of Lr/D=0.5 is provided downstream of a kneading zones of Lk/D of 3.0 disposed at the position of L/D=35. Raw materials other than fibrous inorganic filling material (C) are fed at the extruder base (at the position of L/D=33) as shown in Table 2, while fibrous inorganic filling material (C) is fed into the extruder (at the position of L/D=1) through a side feeder provided at the position of L/D=33. Volatile components are removed at gauge pressure 0.1 MPa with a vent vacuum zone disposed at the position of L/D=40. The melt resin is discharged through the die head from 4 mmϕ×23 holes to be formed as a strand to be cooled through a cooling bath, so that a pellet of resin R7 sample is prepared by cutting with a pelletizer.

Producing Method P4

As performing a nitrogen flow, components mixed at proportions shown in Table 2 are melt-compounded at cylinder temperature shown in Table 2, screw rotation rate 200 rpm and extrusion rate 300 kg/h with an equi-directional rotation complete meshing type twin-screw extruder (TEX-65αII made by The Japan Steel Works, Ltd.) having two double-thread screws of screw diameter of 65 mm and L/D=35, to discharge a strand of melt resin through the discharge spout (L/D=35). In the screw configuration, three kneading zones started from the positions of L/D=7, 16 and 25 while each kneading zone has Lk/D of 3.0, 3.0 and 3.0 respectively. Reverse screw zones of Lr/D=0.5, 0.5 and 0.5 are provided downstream of the kneading zones. The length ratio [%] of total length of kneading zones to whole screw length is found to be 26% by calculating according to formula of (total length of kneading zones)/(whole screw length)×100. Raw materials other than fibrous inorganic filling material (C) are fed at the extruder base (at the position of L/D=23) as shown in Table 2, while fibrous inorganic filling material (C) is fed into the extruder (at the position of L/D=1) through a side feeder provided at the position of L/D=23. Volatile components are removed at gauge pressure 0.1 MPa with a vent vacuum zone disposed at the position of L/D=30. The melt resin is discharged through the die head from 4 mmϕ×23 holes to be formed as a strand to be cooled through a cooling bath, so that a pellet of resin R8-R15, R18 samples are prepared by cutting with a pelletizer.

Resins R1-R15 and R18

Pellets prepared by the above-described producing method are vacuum-dried to prepare test pieces with an injection molding machine for evaluating predetermined characteristics. Thus prepared test pieces are subjected to the measurements of stiffness (flexural modulus), Charpy V-notch impact, microparticle proportion in dispersed phase (B). The measurement results are shown in Tables 1 and 2. Through morphology observations, it is found that all samples have continuous phase (A) constituted by the polyamide resin and dispersed phase (B) constituted by the rubbery polymer having reactive functional group. A JIS-5A dumbbell test piece made of resin R1 with SE30D made by Sumitomo Heavy Industries, Ltd. is subjected to the tensile test with AUTOGRAPH AG100kNG (made by Shimadzu Corporation). We found that a relation of E(V1)>E(V2) at V1<V2 is satisfied, where E(V1) and E(V2) are tensile elastic moduli corresponding to tension speeds of V1 and V2 respectively in a tensile test. The tensile test is performed under a condition of the chuck interval of 50 mm and the tension speeds are 100 mm/min, 500 mm/min and 1000 mm/min.

Examples 1-16

The pellet (resins R1-R15) produced by the above-described producing method was vacuum-dried to make formed body (D1) and formed body (D2) which were rectangular plates of 80 mm×80 mm with the minimum thickness shown in Tables 3 and 4 by injection-molding. Formed body (D1) and formed body (D2) shown in Tables 3 and 4 were superposed on each other to produce impact-absorbing members. The above-described high-speed drop-weight impact test was performed to evaluate "impact-absorbing ability—1" while formed body (D1) was disposed at the impact-receiving side and formed body (D2) was disposed at the opposite side. The test results are shown in Tables 3 and 4. Thus obtained impact-absorbing member were of great practical values excellent in impact-absorbing ability and stiffness and capable of absorbing external impact energy with shorter deformation.

Examples 17-20

"Impact-absorbing ability—1" was evaluated with an impact-absorbing member prepared by the same method as Example 2, except that formed body (D1) and formed body (D2) shown in Table 4 were two-color molded. The test results are shown in Table 4. Thus obtained impact-absorbing members were of great practical values excellent in impact-absorbing ability and stiffness and capable of absorbing external impact energy with shorter deformation.

Examples 21-23

The pellet (resins R1, R8, R12 or R18) produced by the above-described producing method was vacuum-dried to make formed body (D1) with ribs (thickness 2 mm; height 10 mm; pitch 10 mm×10 mm) on a rectangular plate of 80 mm×80 mm with the minimum thickness shown in Table 5 and formed body (D2) of the rectangular plate of 80 mm×80 mm with the minimum thickness shown in Table 5, by injection-molding. Formed body (D1) with ribs and formed body (D2) shown in Table 5 were superposed on each other to produce an impact-absorbing member. The above-described high-speed drop-weight impact test was performed to evaluate "impact-absorbing ability—2" while formed body (D1) with ribs was disposed at the impact-receiving side and formed body (D2) of the rectangular plate was disposed at the opposite side. The test results are shown in Table 5. Thus obtained impact-absorbing members were of great practical values excellent in impact-absorbing ability and capable of absorbing external impact energy with shorter deformation.

Examples 24-25

"Impact-absorbing ability—2" was evaluated with an impact-absorbing member prepared by the same method as Example 21, except that formed body (D1) with ribs and formed body (D2) of the rectangular plate shown in Table 5 were two-color molded. The test results are shown in Table 5. Thus obtained impact-absorbing members were of great practical values excellent in impact-absorbing ability and capable of absorbing external impact energy with shorter deformation.

Comparative Example 1

An impact-absorbing ability was evaluated with an impact-absorbing member prepared by the same method as Example 2, except that single formed body (D2) shown in Table 6 was employed. The test result is shown in Table 6. Thus obtained impact-absorbing member was not of sufficiently practical value since the high-speed drop-weight impact test brought about much deformation to cause a penetration breakdown.

Comparative Example 2

An impact-absorbing ability was evaluated with an impact-absorbing member prepared by the same method as Example 2, except that single formed body (D1) shown in Table 6 was employed. The test result is shown in Table 6. Thus obtained impact-absorbing member was subjected to the high-speed drop-weight impact test, so that the member had a crack. This member was found not to be suitable as an impact-absorbing member because sharp-edge fractions might spread when external impact energy is applied, and a container made of the member might have leakage of fluid content.

Comparative Examples 3-4

An impact-absorbing ability was evaluated with an impact-absorbing member prepared by the same method as Example 2, except that formed body (D2) shown in Table 6 was disposed at the impact-receiving side. The test results are shown in Table 6. Thus obtained impact-absorbing member was subjected to the high-speed drop-weight impact test, and then formed body (D2) disposed at the impact-receiving side had a penetration breakdown while formed body (D1) disposed at the opposite side had a crack. These members were found not to be suitable as an impact-absorbing member because sharp-edge fractions might spread when external impact energy is applied, and a container made of the members might have leakage of fluid content.

Comparative Example 5

An impact-absorbing ability was evaluated with an impact-absorbing member prepared by the same method as Example 2, except that formed body (D1) made of fiber-reinforced resin R16 (CM1011G30 made by Toray Industries, Inc.) containing no rubbery polymer (B) having reactive functional group shown in Table 6 was disposed at the impact-receiving side. The test result is shown in Table 6. Thus obtained impact-absorbing member was subjected to the high-speed drop-weight impact test, and then formed body (D1) disposed at the impact-receiving side had a breakdown while formed body (D2) disposed at the opposite side had a penetration breakdown. This member was found not to be suitable as an impact-absorbing member because sharp-edge fractions might spread when external impact energy is applied, and a container made of the member might have leakage of fluid content.

Comparative Example 6

An impact-absorbing ability was evaluated with an impact-absorbing member prepared by the same method as Example 2, except that formed body (D2) is made of non-reinforced resin R17 (CM1021 made by Toray Industries, Inc.) containing no rubbery polymer (B) having reactive functional group shown in Table 6 while formed body (D1) shown in Table 5 was employed. The test result is shown in Table 6. Thus obtained impact-absorbing member was subjected to the high-speed drop-weight impact test, so that formed body (D1) disposed at the impact-receiving side had a crack while formed body (D2) disposed at the opposite side had a brittle failure. This member was found not to be suitable as an impact-absorbing member because sharp-edge fractions might spread when external impact energy is applied, and a container made of the member might have leakage of fluid content.

TABLE 1

|  |  | Unit | Resin R1 | Resin R2 | Resin R3 | Resin R4 | Resin R5 | Resin R6 |
|---|---|---|---|---|---|---|---|---|
| Polyamide resin (A) | Kind | — | A-1 | A-1 | A-1 | A-1 | A-2 | A-3 |
|  | Proportion | Part by weight | 70 | 70 | 70 | 60 | 80 | 70 |
| Rubbery polymer | Kind | — | B-1 | B-1 | B-2 | B-3 | B-2 | B-2 |
| (B) having reactive functional group | Proportion | Part by weight | 30 | 30 | 30 | 40 | 20 | 30 |
| Fibrous inorganic | Kind | — | — | — | — | — | — | — |
| filling material (C) | Proportion | Part by weight | — | — | — | — | — | — |
| Manufacturing method |  | — | Manufacturing method P1 | Manufacturing method P2 | Manufacturing method P2 | Manufacturing method P2 | Manufacturing method P2 | Manufacturing method P2 |
| Extruder cylinder temperature |  | ° C. | 230 | 230 | 230 | 230 | 270 | 230 |
| Stiffness (flexural modulus) |  | MPa | 1500 | 1500 | 1180 | 1700 | 1600 | 950 |
| Charpy V-notch impact |  | kJ/m$^2$ | 105 | 90 | 140 | 105 | 95 | 120 |
| Microparticle proportion in dispersed phase (B) |  | % | 24 | Less than 10 | Less than 10 | Less than 10 | Less than 10 | Less than 10 |

TABLE 2

|  |  | Unit | Resin R7 | Resin R8 | Resin R9 | Resin R10 | Resin R11 |
|---|---|---|---|---|---|---|---|
| Polyamide resin (A) | Kind | — | A-1 | — | — | — | — |
|  | Proportion | Part by weight | 70 | — | — | — | — |
| Rubbery polymer (B) having reactive functional group | Kind | — | B-1 | — | — | — | — |
|  | Proportion | Part by weight | 30 | — | — | — | — |
| Composite composition | Kind of polyamide resin-rubbery polymer (A-B) composite composition | — | — | — | Resin R1 | — | — |
|  | Kind of polyamide resin-rubbery polymer (A-B) | — | — | — | — | Resin R2 | Resin R3 | Resin R4 |

TABLE 2-continued

|  |  | Unit |  |  |  |  |  |
|---|---|---|---|---|---|---|---|
| | composite composition Proportion | Part by weight | — | 100 | 100 | 100 | 100 |
| Fibrous inorganic filling material (C) | Kind | — | C-1 | C-1 | C-1 | C-1 | C-1 |
| | Proportion | Part by weight | 43 | 43 | 43 | 43 | 43 |
| | Manufacturing method | — | Manufacturing method P3 | Manufacturing method P4 | Manufacturing method P4 | Manufacturing method P4 | Manufacturing method P4 |
| | Extruder cylinder temperature | °C. | 230 | 230 | 230 | 230 | 230 |
| | Stiffness (flexural modulus) | MPa | 6500 | 6500 | 6500 | 6000 | 7400 |
| | Charpy V-notch impact | kJ/m² | 35 | 37 | 30 | 41 | 35 |
| | Microparticle proportion in dispersed phase (B) | % | 25 | 28 | Less than 10 | Less than 10 | Less than 10 |

|  |  | Unit | Resin R12 | Resin R13 | Resin R14 | Resin R15 | Resin R16 |
|---|---|---|---|---|---|---|---|
| Polyamide resin (A) | Kind | — | — | — | — | — | — |
| | Proportion | Part by weight | — | — | — | — | — |
| Rubbery polymer (B) having reactive functional group | Kind | — | — | — | — | — | — |
| | Proportion | Part by weight | — | — | — | — | — |
| Composite composition | Kind of polyamide resin-rubbery polymer (A-B) composite composition | — | — | — | Resin R1 | Resin R1 | — |
| | Kind of polyamide resin-rubbery polymer (A-B) composite composition | — | Resin R6 | Resin R6 | — | — | Resin R5 |
| | Proportion | Part by weight | 100 | 100 | 100 | 100 | 100 |
| Fibrous inorganic filling material (C) | Kind | — | C-1 | C-1 | C-1 | C-1 | C-2 |
| | Proportion | Part by weight | 43 | 43 | 18 | 82 | 43 |
| | Manufacturing method | — | Manufacturing method P4 | Manufacturing method P4 | Manufacturing method P4 | Manufacturing method P4 | Manufacturing method P4 |
| | Extruder cylinder temperature | °C. | 270 | 230 | 230 | 230 | 270 |
| | Stiffness (flexural modulus) | MPa | 8000 | 4700 | 3700 | 10000 | 5200 |
| | Charpy V-notch impact | kJ/m² | 30 | 35 | 29 | 35 | 33 |
| | Microparticle proportion in dispersed phase (B) | % | Less than 10 | Less than 10 | Less than 10 | Less than 10 | Less than 10 |

TABLE 3

|  |  |  | Example 1 | Example 2 | Example 3 | Example 4 | Example 5 |
|---|---|---|---|---|---|---|---|
| Disposition of impact-absorbing member | Impact-receiving side | Formed body | D1 | D1 | D1 | D1 | D1 |
| | | Minimum thickness [mm] | 5 | 5 | 5 | 5 | 5 |
| | | Resin | R7 | R8 | R9 | R10 | R11 |
| | Opposite side | Formed body | D2 | D2 | D2 | D2 | D2 |
| | | Minimum thickness [mm] | 1 | 1 | 1 | 1 | 1 |
| | | Resin | R1 | R1 | R1 | R1 | R1 |
| | (d1) + (d2) in Relation (I) | | 6 | 6 | 6 | 6 | 6 |
| | (d1)/(d2) in Relation (II) | | 5 | 5 | 5 | 5 | 5 |
| | Disposition | | Superposed | Superposed | Superposed | Superposed | Superposed |
| Impact-absorbing ability - 1 (Result of high-speed Drop-Weight Impact Test) | Impact-receiving side | Surface form | A | A | B | A | B |
| | Opposite side | Surface form | A | A | A | A | A |
| | Maximum deformation [mm] | | 13 | 12 | 16 | 14 | 16 |

|  |  |  | Example 6 | Example 7 | Example 8 | Example 9 | Example 10 |
|---|---|---|---|---|---|---|---|
| Disposition of impact-absorbing member | Impact-receiving side | Formed body | D1 | D1 | D1 | D1 | D1 |
| | | Minimum thickness [mm] | 5 | 5 | 5 | 5 | 5 |
| | | Resin | R8 | R8 | R8 | R12 | R13 |
| | Opposite side | Formed body | D2 | D2 | D2 | D2 | D2 |
| | | Minimum thickness [mm] | 1 | 1 | 1 | 1 | 1 |
| | | Resin | R2 | R3 | R4 | R5 | R6 |
| | (d1) + (d2) in Relation (I) | | 6 | 6 | 6 | 6 | 6 |
| | (d1)/(d2) in Relation (II) | | 5 | 5 | 5 | 5 | 5 |
| | Disposition | | Superposed | Superposed | Superposed | Superposed | Superposed |
| Impact-absorbing ability - 1 (Result of high-speed Drop-Weight Impact Test) | Impact-receiving side | Surface form | A | A | A | B | A |
| | Opposite side | Surface form | A | A | A | A | A |
| | Maximum deformation [mm] | | 14 | 13 | 14 | 18 | 15 |

TABLE 4

|  |  |  | Example 11 | Example 12 | Example 13 | Example 14 | Example 15 |
|---|---|---|---|---|---|---|---|
| Disposition of impact-absorbing member | Impact-receiving side | Formed body | D1 | D1 | D1 | D1 | D1 |
|  |  | Minimum thickness [mm] | 5 | 5 | 5 | 5 | 3 |
|  |  | Resin | R8 | R13 | R14 | R15 | R8 |
|  | Opposite side | Formed body | D2 | D2 | D2 | D2 | D2 |
|  |  | Minimum thickness [mm] | 1 | 1 | 1 | 1 | 2 |
|  |  | Resin | R5 | R1 | R1 | R1 | R1 |
|  | (d1) + (d2) in Relation (I) |  | 6 | 6 | 6 | 6 | 5 |
|  | (d1)/(d2) in Relation (II) |  | 5 | 5 | 5 | 5 | 1.5 |
|  | Disposition |  | Superposed | Superposed | Superposed | Superposed | Superposed |
| Impact-absorbing ability - 1 (Result of high-speed Drop-Weight Impact Test) | Impact-receiving side | Surface form | A | A | B | A | B |
|  | Opposite side | Surface form | A | A | A | A | A |
|  |  | Maximum deformation [mm] | 14 | 14 | 14 | 12 | 19 |

|  |  |  | Example 16 | Example 17 | Example 18 | Example 19 | Example 20 |
|---|---|---|---|---|---|---|---|
| Disposition of impact-absorbing member | Impact-receiving side | Formed body | D1 | D1 | D1 | D1 | D1 |
|  |  | Minimum thickness [mm] | 3 | 5 | 5 | 3 | 3 |
|  |  | Resin | R8 | R8 | R10 | R8 | R10 |
|  | Opposite side | Formed body | D2 | D2 | D2 | D2 | D2 |
|  |  | Minimum thickness [mm] | 1 | 1 | 1 | 1 | 1 |
|  |  | Resin | R1 | R1 | R3 | R1 | R3 |
|  | (d1) + (d2) in Relation (I) |  | 4 | 6 | 6 | 4 | 4 |
|  | (d1)/(d2) in Relation (II) |  | 3 | 5 | 5 | 3 | 3 |
|  | Disposition |  | Superposed | Two-color molded | Two-color molded | Two-color molded | Two-color molded |
| Impact-absorbing ability - 1 (Result of high-speed Drop-Weight Impact Test) | Impact-receiving side | Surface form | B | A | A | B | B |
|  | Opposite side | Surface form | A | A | A | A | A |
|  |  | Maximum deformation [mm] | 18 | 12 | 14 | 18 | 25 |

TABLE 5

|  |  |  | Example 21 | Example 22 | Example 23 | Example 24 | Example 25 |
|---|---|---|---|---|---|---|---|
| Disposition of impact-absorbing member | Impact-receiving side | Formed body | D1 | D1 | D1 | D1 | D1 |
|  |  | Minimum thickness [mm] | 3 | 3 | 3 | 3 | 3 |
|  |  | Resin | R8 | R12 | R18 | R8 | R10 |
|  | Opposite side | Formed body | D2 | D2 | D2 | D2 | D2 |
|  |  | Minimum thickness [mm] | 1 | 1 | 1 | 1 | 1 |
|  |  | Resin | R1 | R1 | R1 | R1 | R3 |
|  | (d1) + (d2) in Relation (I) |  | 4 | 4 | 4 | 4 | 4 |
|  | (d1)/(d2) in Relation (II) |  | 3 | 3 | 3 | 3 | 3 |
|  | Disposition |  | Superposed | Superposed | Superposed | Two-color molded | Two-color molded |
| Impact-absorbing ability - 2 (Result of high-speed Drop-Weight Impact Test) | Impact-receiving side | Surface form | B | B | B | B | B |
|  | Opposite side | Surface form | A | A | A | A | A |
|  |  | Maximum deformation [mm] | 17 | 20 | 17 | 19 | 21 |

TABLE 6

|  |  |  | Comparative example 1 | Comparative example 2 | Comparative example 3 | Comparative example 4 | Comparative example 5 | Comparative example 6 |
|---|---|---|---|---|---|---|---|---|
| Disposition of impact-absorbing member | Impact-receiving side | Formed body | D2 | D1 | D2 | D2 | D1 | D1 |
|  |  | Minimum thickness [mm] | 3 | 5 | 1 | 2 | 5 | 3 |
|  |  | Resin | R1 | R8 | R1 | R1 | R16 | R8 |
|  | Opposite side | Formed body | — | — | D1 | D1 | D2 | D2 |
|  |  | Minimum thickness [mm] | — | — | 5 | 5 | 1 | 1 |
|  |  | Resin | — | — | R8 | R8 | R1 | R17 |

TABLE 6-continued

| | | Comparative example 1 | Comparative example 2 | Comparative example 3 | Comparative example 4 | Comparative example 5 | Comparative example 6 |
|---|---|---|---|---|---|---|---|
| | (d1) + (d2) in Relation (I) | 3 | 5 | 6 | 7 | 6 | 4 |
| | (d1)/(d2) in Relation (II) | 0 | 0 | 0.2 | 0.4 | 5 | 3 |
| | Disposition | Single body | Single body | Superposed | Superposed | Superposed | Superposed |
| Impact-absorbing ability - 1 (Result of high-speed Drop-Weight Impact Test) | Impact-receiving side Surface form | C | B | C | C | C | B |
| | Opposite side Surface form | — | — | B | B | C | C |
| | Maximum deformation [mm] | Penetrated | 17 | 16 | 15 | Penetrated | Brittle failure |

The invention claimed is:

1. An impact-absorbing member of an automotive interior or exterior, wherein a formed body (D1) made of a fiber-reinforced resin composition comprising a polyamide resin, a rubbery polymer having a reactive functional group and a fibrous inorganic filling material is superposed on another formed body (D2) made of a non-reinforced resin composition comprising a polyamide resin and a rubbery polymer having a reactive functional group, wherein the formed body (D1) has an impact-receiving side and is adapted to absorb an impact on the impact-receiving side and the formed body (D2) is adapted to absorb a residual impact through the formed body (D1).

2. The impact-absorbing member according to claim 1, wherein a minimum thickness (d1) of the formed body (D1) is 1.0 to 10.0=1 while a minimum thickness (d2) of the formed body (D2) is 0.5 to 5.0 mm.

3. The impact-absorbing member according to claim 1, wherein a minimum thickness (d1) of the formed body (D1) and a minimum thickness (d2) of the formed body (D2) satisfy (I) and (II):

$$2.3 \text{ mm} \leq (d1)+(d2) \leq 12.0 \text{ mm} \quad (I)$$

$$0.4 \leq (d1)/(d2) \leq 10.0. \quad (II)$$

4. The impact-absorbing member of claim 1, wherein the reactive functional group of the rubbery polymer is at least one of a reactive functional group selected from the group consisting of epoxy group, acid anhydride group, amino group, carboxyl group, carboxyl metal salt and oxazoline group.

5. The impact-absorbing member of claim 1, wherein the formed body (D1) and the formed body (D2) have a continuous phase (A) of the polyamide resin and a dispersed phase (B) of the rubbery polymer having the reactive functional group with a morphology of 10% or more of an area covered with microparticles having a particle diameter of 1 to 100 nm and are generated by a reaction between the polyamide resin and the rubbery polymer having the reactive functional group, wherein the continuous phase (A) and the dispersed phase (B) are observed with an electron microscope.

6. The impact-absorbing member of claim 1, wherein the member receives an impact force in a protective container.

7. The impact-absorbing member according to claim 2, wherein a minimum thickness (d1) of the formed body (D1) and a minimum thickness (d2) of the formed body (D2) satisfy (I) and (II):

$$2.3 \text{ mm} \leq (d1)+(d2) \leq 12.0 \text{ mm} \quad (I)$$

$$0.4 \leq (d1)/(d2) \leq 10.0. \quad (II)$$

8. The impact-absorbing member of claim 2, wherein the reactive functional group of the rubbery polymer is at least one of a reactive functional group selected from the group consisting of epoxy group, acid anhydride group, amino group, carboxyl group, carboxyl metal salt and oxazoline group.

9. The impact-absorbing member of claim 3, wherein the reactive functional group of the rubbery polymer is at least one of a reactive functional group selected from the group consisting of epoxy group, acid anhydride group, amino group, carboxyl group, carboxyl metal salt and oxazoline group.

10. The impact-absorbing member of claim 2, wherein the formed body (D1) and the formed body (D2) have a continuous phase (A) of the polyamide resin and a dispersed phase (B) of the rubbery polymer having the reactive functional group with a morphology of 10% or more of an area covered with microparticles having a particle diameter of 1 to 100 nm and are generated by a reaction between the polyamide resin and the rubbery polymer having the reactive functional group, wherein the continuous phase (A) and the dispersed phase (B) are observed with an electron microscope.

11. The impact-absorbing member of claim 3, wherein the formed body (D1) and the formed body (D2) have a continuous phase (A) of the polyamide resin and a dispersed phase (B) of the rubbery polymer having the reactive functional group with a morphology of 10% or more of an area covered with microparticles having a particle diameter of 1 to 100 nm and are generated by a reaction between the polyamide resin and the rubbery polymer having the reactive functional group, wherein the continuous phase (A) and the dispersed phase (B) are observed with an electron microscope.

12. The impact-absorbing member of claim 4, wherein the formed body (D1) and the formed body (D2) have a continuous phase (A) of the polyamide resin and a dispersed phase (B) of the rubbery polymer having the reactive functional group with a morphology of 10% or more of an area covered with microparticles having a particle diameter of 1 to 100 nm and are generated by a reaction between the polyamide resin and the rubbery polymer having the reactive functional group, wherein the continuous phase (A) and the dispersed phase (B) are observed with an electron microscope.

13. The impact-absorbing member of claim 2, wherein the member receives an impact force in a protective container.

14. The impact-absorbing member of claim 3, wherein the member receives an impact force in a protective container.

15. The impact-absorbing member of claim 4, wherein the member receives an impact force in a protective container.

16. The impact-absorbing member of claim 5, wherein the member receives an impact force in a protective container.

\* \* \* \* \*

UNITED STATES PATENT AND TRADEMARK OFFICE
CERTIFICATE OF CORRECTION

PATENT NO. : 9,452,596 B2
APPLICATION NO. : 14/419116
DATED : September 27, 2016
INVENTOR(S) : Suzuki et al.

It is certified that error appears in the above-identified patent and that said Letters Patent is hereby corrected as shown below:

In the Specification

Columns 23 and 24
At Table 2-continued, at the subheading "Resin R12", please change "Resin R6" to --Resin R5--;
at the subheading "Resin R16", please change "5200" to --8200--.

Column 26
At Table 4, at the subheading "Example 20", please change "25" to --20--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*